(12) United States Patent
Mega et al.

(10) Patent No.: US 10,761,555 B2
(45) Date of Patent: Sep. 1, 2020

(54) SHIFTING DEVICE

(71) Applicant: KABUSHIKI KAISHA TOKAI RIKA DENKI SEISAKUSHO, Aichi (JP)

(72) Inventors: Susumu Mega, Aichi (JP); Katsushi Miwa, Aichi (JP); Toshiharu Katagiri, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 130 days.

(21) Appl. No.: 15/772,233

(22) PCT Filed: Oct. 24, 2016

(86) PCT No.: PCT/JP2016/081455
§ 371 (c)(1),
(2) Date: Apr. 30, 2018

(87) PCT Pub. No.: WO2017/082032
PCT Pub. Date: May 18, 2017

(65) Prior Publication Data
US 2018/0341284 A1    Nov. 29, 2018

(30) Foreign Application Priority Data
Nov. 11, 2015    (JP) .................................. 2015-221527

(51) Int. Cl.
*G05G 1/04*    (2006.01)
*B60K 20/02*    (2006.01)
(Continued)

(52) U.S. Cl.
CPC .............. *G05G 1/04* (2013.01); *B60K 20/02* (2013.01); *B60K 20/08* (2013.01); *B60K 37/06* (2013.01);
(Continued)

(58) Field of Classification Search
CPC ...... H01H 25/008; B60K 37/06; B60K 20/02; B60K 20/08; F16H 59/12
See application file for complete search history.

(56) References Cited

U.S. PATENT DOCUMENTS 2,941,047 A * 6/1960 Grashoff ................. H01H 23/02
                                                            200/4
4,314,111 A * 2/1982 Kobayashi ........... H01H 25/008
                                                        15/250.01
(Continued)

FOREIGN PATENT DOCUMENTS

JP    54-129763    9/1979
JP    05-096968    4/1993
(Continued)

OTHER PUBLICATIONS

International Search Report issued in Japan Patent Application No. PCT/JP2016/081455, dated Jan. 24, 2017.
(Continued)

*Primary Examiner* — Patrick Cicchino
(74) *Attorney, Agent, or Firm* — Greenblum & Bernstein, P.L.C.

(57) ABSTRACT

This shifting device is equipped with an operation unit that is operated for switching among a plurality of shift ranges of a transmission installed in a vehicle. The operation unit includes: a first operation portion that is operated by pressing; and a plurality of second operation portions that are arranged on either side of the first operation portion and are operated in different directions about their common turning axis.

8 Claims, 5 Drawing Sheets

(51) Int. Cl.
*B60K 20/08* (2006.01)
*B60K 37/06* (2006.01)
*F16H 59/12* (2006.01)
*H01H 25/00* (2006.01)

(52) U.S. Cl.
CPC ........... *F16H 59/12* (2013.01); *H01H 25/008* (2013.01); *B60K 2370/131* (2019.05)

(56) References Cited

U.S. PATENT DOCUMENTS

| | | | | |
|---|---|---|---|---|
| 5,736,703 | A | * | 4/1998 | Kim ...................... G06F 3/0485 200/1 B |
| 6,646,211 | B2 | * | 11/2003 | Taniuchi ................ H01H 23/14 200/18 |
| 8,172,838 | B2 | * | 5/2012 | Schnitzler .......... A61B 18/1402 606/41 |
| 2007/0077058 | A1 | * | 4/2007 | Kontani ................. B60K 37/06 396/389 |
| 2012/0001747 | A1 | | 1/2012 | Klatt et al. |
| 2012/0330518 | A1 | | 12/2012 | Kim |
| 2013/0333510 | A1 | * | 12/2013 | Paakkinen ............... G05G 1/01 74/490.12 |
| 2015/0311010 | A1 | * | 10/2015 | Lee ........................ H01H 9/287 200/43.18 |
| 2019/0145513 | A1 | * | 5/2019 | Ono ........................ F16H 59/12 |

FOREIGN PATENT DOCUMENTS

| | | |
|---|---|---|
| JP | 05-276627 | 10/1993 |
| JP | 2000-118256 | 4/2000 |
| JP | 2011-181337 | 9/2011 |
| JP | 2012-71649 | 4/2012 |
| JP | 2012071649 A * | 4/2012 |
| JP | 2013-159270 | 8/2013 |

OTHER PUBLICATIONS

International Preliminary Report on Patentability dated May 15, 2018 (English translation).

* cited by examiner

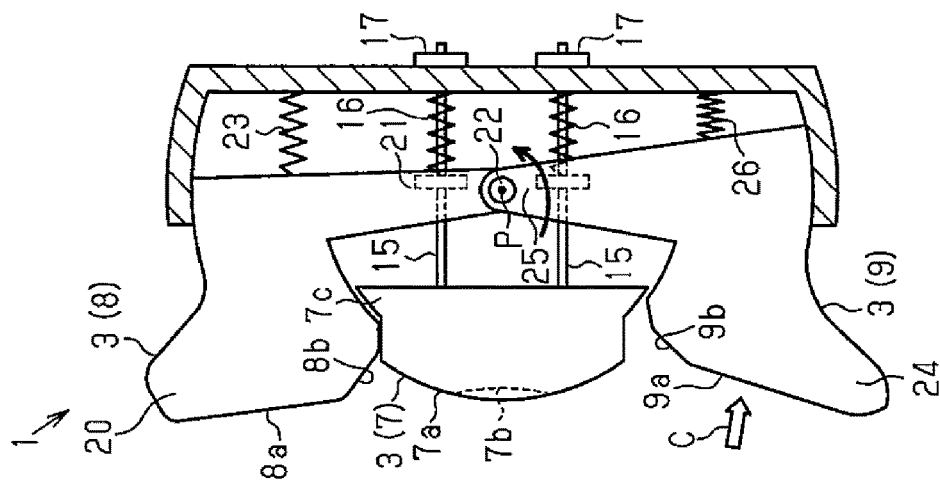
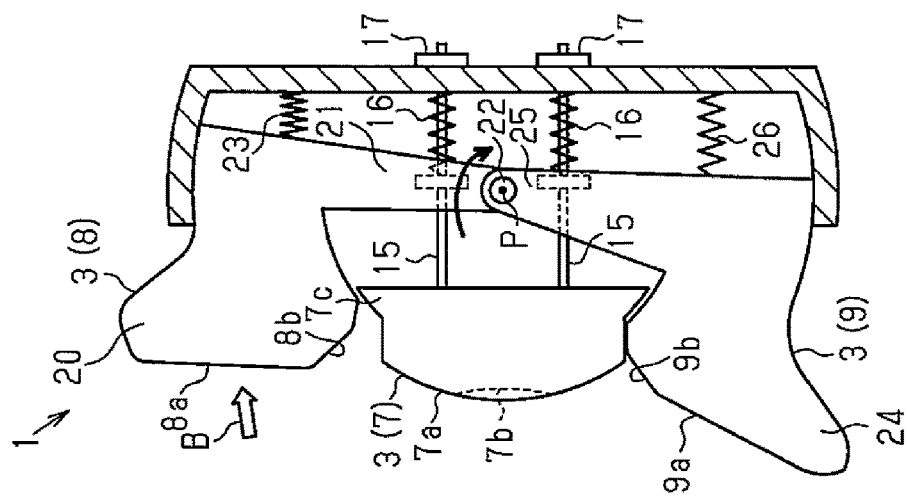
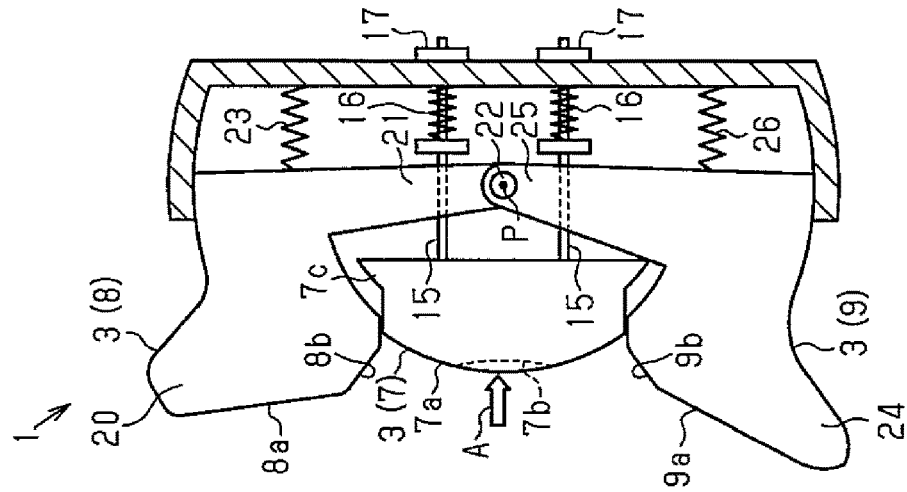

SHIFTING DEVICE

TECHNICAL FIELD

The present invention relates to a shifting device operated to switch shift ranges of a transmission.

BACKGROUND ART

Conventionally, a vehicle includes, for example, a shifting device operated to switch shift ranges of a transmission (automatic transmission). In order to reduce the device in size and improve the operability, a shifting device of a shift-by-wire type has been developed (refer to, for example, patent document 1). The shifting device of patent document 1 is configured to switch shift ranges of a transmission by operating a push switch provided for each shift range.

PRIOR ART DOCUMENT

Patent Document

Patent Document 1: Japanese Laid-Open Patent Publication No. 2013-159270

SUMMARY OF THE INVENTION

Problems that are to be Solved by the Invention

However, in patent document 1, a plurality of push switches operated in the same manner are arranged next to one another. Thus, erroneous operations are apt to occur.

It is an object of the present invention to provide a shifting device that reduces erroneous operations.

Means for Solving the Problem

A shifting device includes an operation unit operated to switch a plurality of shift ranges of a transmission installed in a vehicle. The operation unit includes a first operation portion that undergoes a push operation and a plurality of second operation portions located at opposite sides of the first operation portion. The second operation portions are operated in different directions about a common pivot center.

Effect of the Invention

In the present invention, the shifting device reduces erroneous operations.

BRIEF DESCRIPTION OF THE DRAWINGS

FIG. 4 is an operation diagram showing a first operation portion when operated.

FIG. 5 is an operation diagram showing an upper second operation portion when lifted.

FIG. 6 is an operation diagram showing a lower second operation portion when lowered.

EMBODIMENTS OF THE INVENTION

First Embodiment

A first embodiment of a shifting device will now be described with reference to FIGS. 1 to 6.

Figure 1:
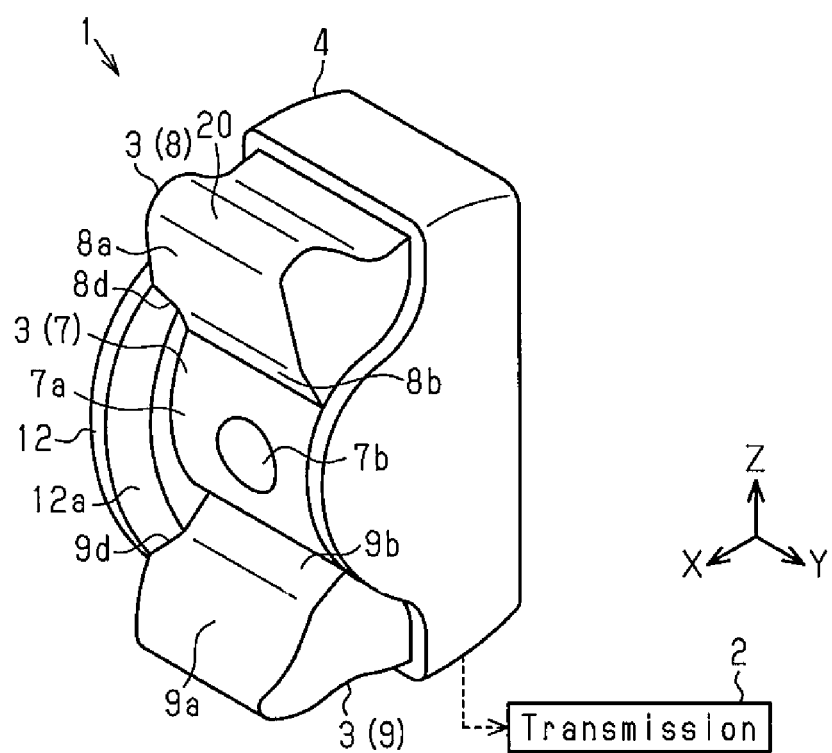
FIG. 1 is a perspective view showing the outer appearance of a first embodiment of a shifting device.

As shown in FIG. 1, a shifting device 1 of a shift-by-wire type includes an operation unit 3 operated to switch a plurality of shift ranges of a transmission 2. In the present example, the shifting device 1 is installed in a right-hand drive vehicle. The operation unit 3 is coupled to a housing 4 of the shifting device 1 in a movable manner. For example, the shift ranges of the transmission 2 include an N-range (neutral range), an R-range (reverse range), a D-range (drive range), and an M-range (manual transmission range). The shifting device 1 is arranged, for example, at or near a center cluster in the vehicle.

The operation unit 3 of the shifting device 1 includes a first operation portion 7 of a push-operation type and a plurality of (two in the present example) second operation portions 8 and 9 arranged at opposite sides of the first operation portion 7. The two second operation portions 8 and 9 are arranged next to each other in a vertical direction (upper and lower directions on the plane of FIG. 1) of the shifting device 1. The first operation portion 7 is arranged between the second operation portions 8 and 9. example, the first operation portion 7 corresponds to an N-range (for switching to N-range), the second operation portion 8 corresponds to an R-range (for switching to R-range), and the second operation portion 9 corresponds to a D-range (for switching to D-range). The second operation portion 8 is configured to be lifted, and the second operation portion 9 is configured to be lowered. The second operation portion 9 may be used to switch to a D-position/M-position. The shifting device 1 selects a corresponding shift range of the transmission in accordance with the operation of any one of the first operation portion 7 and the second operation portions 8 and 9 performed by a driver.

The first operation portion 7 includes an operation surface 7*a* and a recess 7*b* formed in the operation surface 7*a*. The recess 7*b* is configured to guide a finger when the finger presses the operation surface 7*a*. For example, the recess 7*b* is arranged at a substantially middle portion of the operation surface 7*a* and is substantially circular.

The shifting device 1 includes a restriction wall 12 that reduces erroneous operations of the first operation portion 7 and the second operation portions 8 and 9. The restriction wall 12 is located at a passenger seat side of the housing 4 in the widthwise direction (Y-axis direction in FIG. 1) of the first operation portion 7 and the second operation portions 6 and 9. The restriction wall 12 hinders operation of the first operation portion 7 and the second operation portions 8 and 9 from the passenger seat side. The restriction wall 12 is not arranged at a driver seat side of the housing 4. This ensures the operability of the first operation portion 7 and the second operation portions 8 and 9 from the driver seat side.

Figure 2:
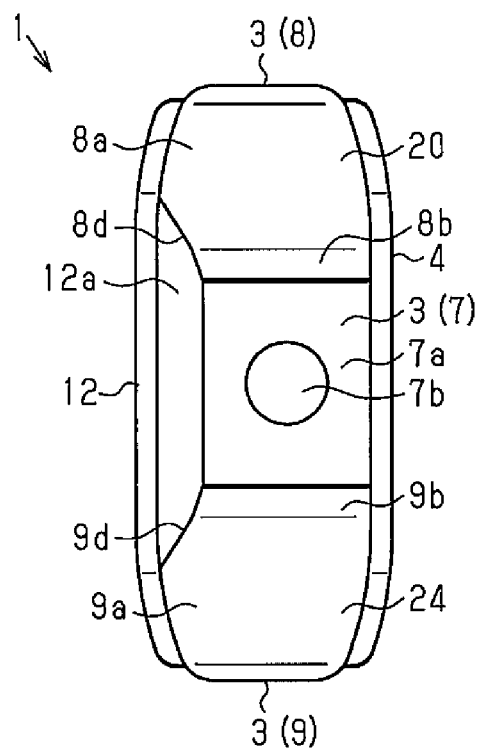
FIG. 2 is a front view showing the shifting device.

As shown in FIG. 2, an end face of the restriction wall 12 includes a tapered surface 12*a* that guides operation of the operation unit 3. The tapered surface 12*a* of the present example is located on the end face of the restriction wall 12 at the side of the operation unit 3 (driver seat side). The second operation portion 8 includes a tapered sliding surface 8*d* that laps over the tapered surface 12*a* of the restriction wall 12. In the same manner as the second operation portion 8, the second operation portion 9 includes a sliding surface 9*d*. It is preferred that the restriction wall 12 be configured to hinder every operation of the operation unit 3. Instead, the restriction wall 12 may be configured to hinder at least one of the operations on the operation unit 3.

Figure 3:
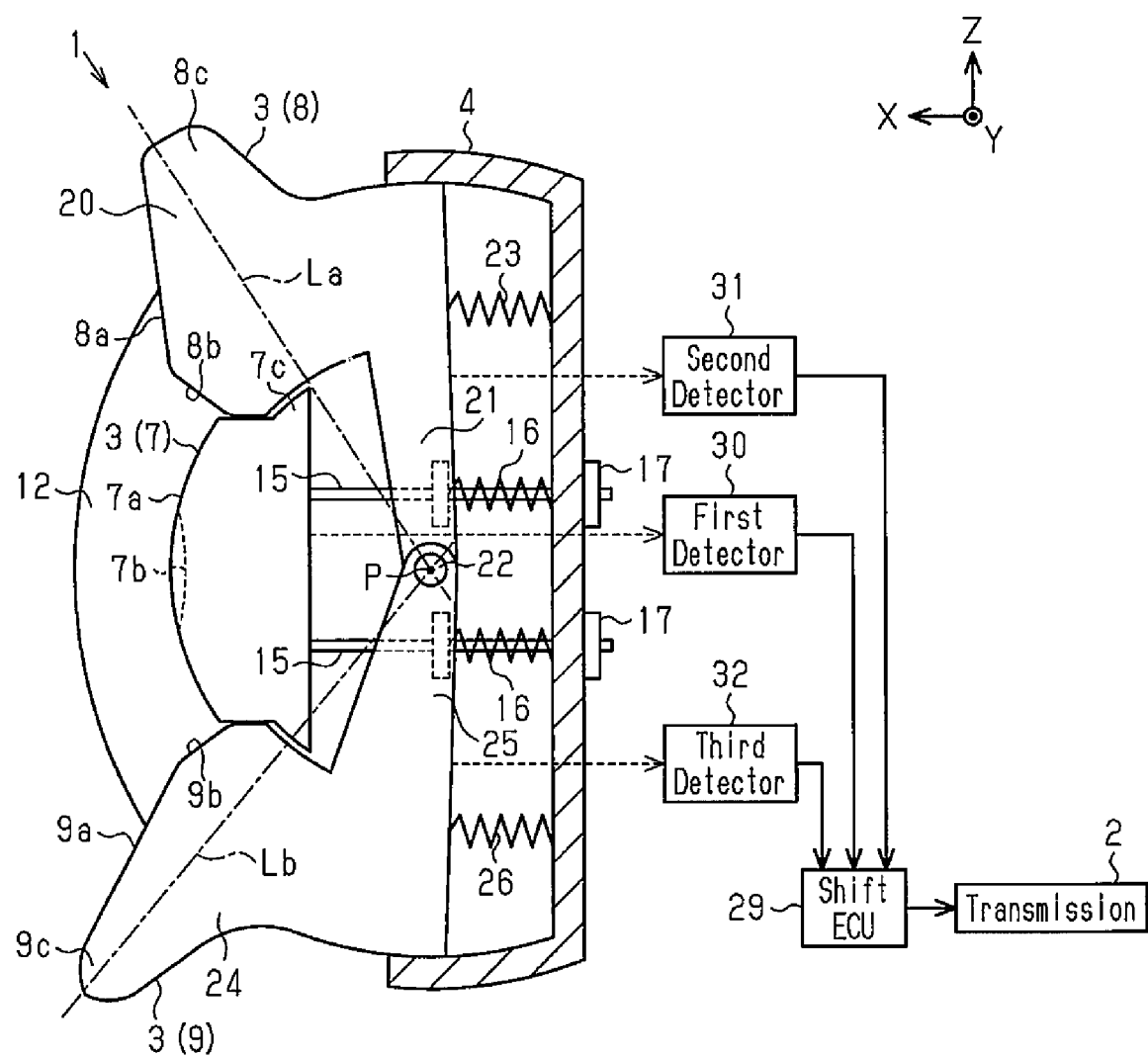
FIG. 3 is a diagram showing the shifting device.

As shown in FIG. 3, the shifting device 1 includes guide shafts 15 arranged on a back surface of the first operation portion 7 and biasing portions 16 coupled to the guide shafts 15. In the present example, a plurality of (two in the present example) guide shafts 15 and biasing portions 16 are arranged in the vertical direction. The guide shafts 15 guide a push operation of the first operation portion 7. The first operation portion 7 is constantly biased by the biasing portions 16 in a projecting direction. Separation restriction members 17 are arranged on ends of the guide shafts 15. The separation restriction members 17 restrict separation of the first operation portion 7 from the housing 4. For example, it is preferred that the biasing portion 16 be a spring. The first operation portion 7 is of a momentary type. Thus, after the first operation portion 7 is pushed from the initial position with a finger and then released, the biasing force of the biasing portion 16 automatically returns the first operation portion 7 to the original initial position. A separation-restriction projection 7*c* that restricts separation from the housing 4 extends along part of or the entire outer circumference of the first operation portion 7.

The second operation portion 8 includes a main body 20 where the second operation portion 8 is operated and an arm 21 extending from the main body 20 toward a back surface. The second operation portion 8 is pivotally supported by a pivot shaft 22 arranged on the shifting device 1. It is preferred that the pivot shaft 22 be arranged on the housing 4 so as to extend, for example, in the widthwise direction of the shifting device 1 (Y-axis direction in FIG. 3). A distal end of the arm 21 of the second operation portion 8 is coupled to the pivot shaft 22. A biasing portion 23 that constantly biases the second operation portion 8 to the initial position is arranged on the back surface of the second operation portion 8. It is preferred that the biasing portion 23 be a spring.

The second operation portion 9 is arranged in symmetry with the second operation portion 8, which is paired with the second operation portion 9. In the same manner as the second operation portion 8, the second operation portion 9 includes a main body 24 and an arm 25. A distal end of the arm 25 of the second operation portion 9 is supported by the pivot shaft 22. A biasing portion 26 that constantly biases the second operation portion 9 to the original initial position is arranged on a back surface of the second operation portion 9. The second operation portions 8 and 9 are pivotal about the pivot center P of the pivot shaft 22. The second operation portions 8 and 9 are of a momentary type. Thus, after the second operation portions 8 and 9 are pushed from the initial position with a finger and then released, the biasing force of the biasing portions 23 and 26 automatically returns the second operation portions 8 and 9 to the original initial position.

The main body 20 of the second operation portion 8 includes an operation surface 8*a* and an adjacent surface 8*b* that is adjacent to the operation surface 8*a* and the first operation portion 7. That is, the second operation portion 8 is arranged adjacent to the first operation surface 7*a* of the first operation portion 7 by way of the adjacent surface 8*b*. The main body 24 of the second operation portion 9 includes an operation surface 9*a* and an adjacent surface 9*b* that is adjacent to the operation surface 9*a* and the first operation portion 7. That is, the second operation portion 9 is arranged adjacent to the first operation surface 7*a* of the first operation portion 7 by way of the adjacent surface 9*b*.

The first operation portion 7 is operated toward the pivot center P. The operation surface 7*a* of the first operation portion 7 is curved about the pivot center P. In the same manner, the restriction wall 12 is curved about the pivot center P. The restriction wall 12 has a height set to be higher than the operation surface 7*a* of the first operation portion. 7 and to intersect parts of the operation surfaces 8*a* and 9*a* of the second operation portions 8 and 9. However, the restriction wall 12 may be formed at a higher position than the operation surfaces 8*a* and 9*a* of the second operation portions 8 and 9 (intersect entire operation surfaces 8*a* and 9*a*). The operation surfaces 8*a* and 9*a* of the second operation portions 8 and 9 are arranged adjacent to the tapered surface 12*a* of the restriction wall 12.

When a line connecting a peak 8*c* of the second operation portion 8 in a radial direction and the pivot center P is represented by "La," the operation surface 8*a* of the second operation portion 8 is inclined with respect to the line La. Further, when a line connecting a peak 9*c* of the second operation portion 9 in the radial direction to the pivot center P is represented by "Lb," the operation surface 9*a* of the second operation portion 9 is inclined with respect to the line Lb. In the present example, the inclination angle of the operation surface 8*a* and the inclination angle of the operation surface 9*a* are set to be different but may be set to be the same.

The shifting device 1 includes a shift ECU 29 that controls movement of the shifting device 1. The shift ECU 29 detects operation of the first operation portion 7 with a first detector 30, detects operation of the second operation portion 8 with a second detector 31, and detects operation of the second operation portion 9 with a third detector 32. It is preferred that the first detector 30 to the third detector 32 be, for example, switches or sensors. The shift ECU 29 controls operation of the transmission 2 based on operation signals received from the first detector 30 to the third detector 32.

The movement of the shifting device 1 will now be described with reference to FIGS. 4 to 6.

As shown in FIG. 4, when the first operation portion 7 is pushed, the first operation portion 7 moves straight in a depth-wise direction (direction shown by arrow A in FIG. 4) against the biasing force of the biasing portions 16. When a push operation of the first operation portion 7 is detected by the first detector 30 located rearward from the first operation portion 7, the shift ECU 29 switches the transmission 2 of the vehicle to an N-range. After the push operation, when a finger is separated from the first operation portion 7, the biasing force of the biasing portions 16 automatically returns the first operation portion 7 to the original initial position.

As shown in big. 5, when the second operation portion 8 is operated in a lifting direction (direction shown by arrow B in FIG. 5), the second operation portion 8 pivots about the pivot shaft 22 and around the rotation center P against the biasing force of the biasing portion 23. When the lifting operation of the second operation portion 8 is detected by the second detector 31 located rearward from the second operation portion 8, the shift ECU 29 switches the transmission 2 of the vehicle to an R-range. After the lifting operation, when a finger is separated from the second operation portion 8, the biasing force of the biasing portion 23 automatically returns the second operation portion 8 to the original initial position.

As shown in FIG. 6, when the second operation portion 9 is operated in a lowering direction (direction shown by arrow C in FIG. 6), the second operation portion 9 pivots about the pivot shaft 22 and around the rotation center P against the biasing force of the biasing portion 26. When the lowering operation of the second operation portion 9 is detected by the third detector 32 located rearward from the second operation portion 9, the shift ECU 29 switches the transmission 2 of the vehicle to a D-range or an M-range. After the lowering operation, when a finger is separated from the second operation portion 9, the biasing force of the biasing portion 26 automatically returns the second operation portion 9 to the original initial position.

In the present example, the shifting device 1 includes the three operation portions 7 to 9. The first operation portion 7 is of a push-operation type, and the second operation portions 8 and 9 commonly use the pivot shaft 22 and are operated in different directions. Conventionally, an operation unit is formed just by arranging a plurality of switches of a push-operation type. The operation unit 3 of the present example is formed by the three operation portions 7 to 9 that are operated in different directions. This allows the shifting device 1 to reduce erroneous operations of the operation unit 3.

When operated, the second operation portions 8 and 9 pivot about the axis of the pivot shaft 22. Thus, the second operation portions 8 and 9 can be operated in the same manner as how a lever is operated. Further, it is easy to assume the operation directions of the second operation portions 8 and 9.

In addition, the employment of the switch structure of the present example allows the first operation portion 7 to be pushed, the second operation portion 8 to be lifted, and the second operation portion 9 to be lowered. As a result, the first operation portion 7, the second operation portion 8, and the second operation portion 9 are operated in different directions. In this structure, the operation surface 7a of the first operation portion 7, the operation surface 8a of the second operation portion 8, and the operation surface 9a of the second operation portion 9 can be arranged in a single line. This is advantageous for reducing the size of the shifting device 1.

The structure of the present embodiment has the advantages described below.

(1) The first operation portion 7 is of a push-operation type, and the two second operation portions 8 and 9 pivot about the common pivot center P. This allows the first operation portion 7 and the second operation portions 6 and 9 to be operated in different directions and reduces erroneous operations.

(2) The second operation portions 8 and 9 have the pivot center P. This allows the second operation portions 8 and 9 to be operated in the same manner as how a lever is operated. In addition, it is easy to assume the operation directions of the second operation portions 8 and 9.

(3) The first operation portion 7 and the second operation portions 8 and 9 are arranged adjacent to one another so that the operation surface 7a of the first operation portion 7 and the operation surfaces 8a and 9a of the second operation portions 8 and 9 are lined in a planar direction. This reduces the space necessary for the arrangement of the first operation portion 7 and the second operation portions 8 and 9 and is advantageous for reducing the size of the device.

(4) The restriction wall 12 that hinders operation of the first operation portion 7 and the second operation portions 8 and 9 from the outer side is arranged at a location adjacent to the first operation portion 7 and the second operation portions 8 and 9 in the widthwise direction (Y-axis direction in FIG. 1 and the like). Thus, even when, for example, a person other than the user attempts to operate the first operation portion 7 and the second operation portions 8 and 9 from beside (passenger seat side), the operation is restricted by the restriction wall 12. This reduces operations that are not intended by the user.

(5) The second operation portions 8 and 9, which are arranged in symmetry, include the main bodies 20 and 24 and the arms 21 and 25, and the arms 21 and 25 are supported by the housing 4. This allows the second operation portions 8 and 9 to have a stable structure in which the pivot shaft 22 supports the arms 21 and 25.

(6) The first operation portion 7 is used for the N-range operation, the second operation portion 8 is used for R-range operation, and the second operation portion 9 is used for D-range operation. The second operation portion 8 for use with R-range operation and the second operation portion 9 for use with D-range operation are arranged sandwiching the first operation portion 7 for use with N-range operation.

(7) The operation surface 8a of the second operation portion 8 and the operation surface 9a of the second operation portion 9 are tapered so as to lap over the tapered surface 12a. More specifically, the second operation portions 8 and 9 respectively include the sliding surfaces 8d and 9d that lap over the tapered surface 12a. This allows the second operation portions 8 and 9 to be operated along the restriction wall 12.

Second Embodiment

A second embodiment will now be described with reference to FIGS. 7 and 8. The second embodiment is an embodiment in which the structures of the second operation portions 8 and 9 of the first embodiment are modified. Thus, like or same reference numerals are given to those components that are the same as the corresponding components of the first embodiment. Such components will not be described in detail, and the description focuses on the differences from the first embodiment.

Figure 7:
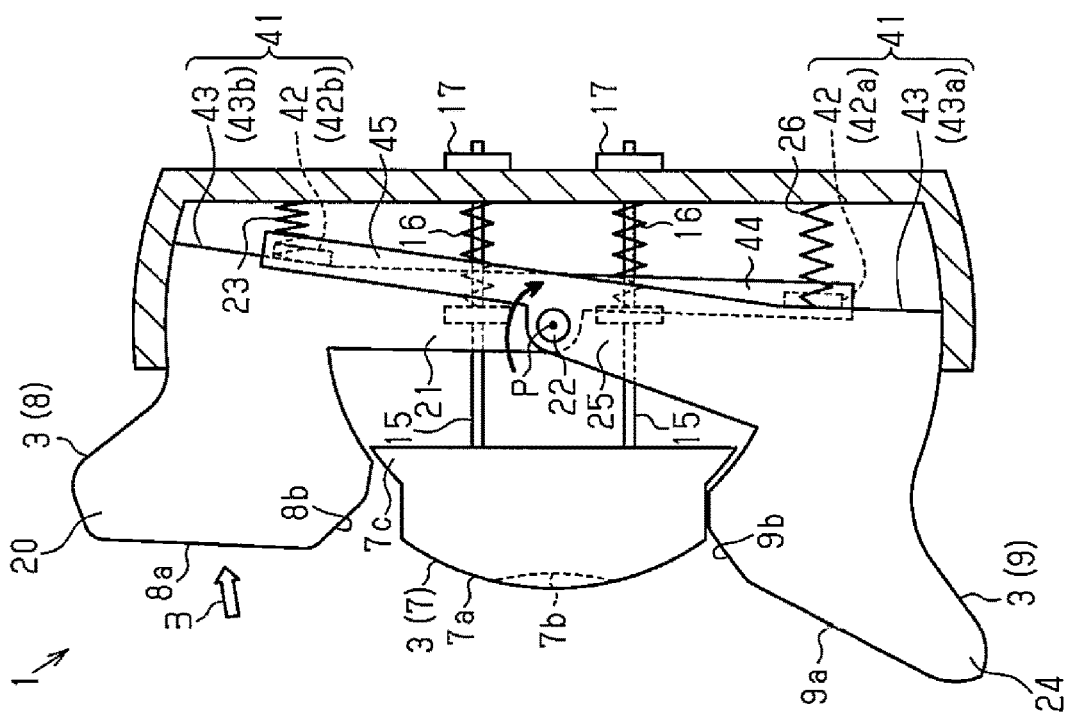
FIG. 7 is a diagram showing a second embodiment of a shifting device.

As shown in FIG. 7, the shifting device 1 includes operation restriction units 41. When one of the second operation portions 8 and 9 is operated, each operation restriction unit 41 hinders operation of the other one of the second operation portions 8 and 9. The operation restriction units 41 each include a projection 42 arranged on one of the second operation portions 8 and 9 and a contact portion 43 arranged on the other one of the second operation portions 8 and 9 to contact the projection 42. In the present example, a projection 42a of the second operation portion 8 is paired with a contact portion 43a of the second operation portion 9, and a projection 42b of the second operation portion 9 is paired with a contact portion 43b of the second operation portion 8. The projections 42a and 42b are respectively formed on side walls of extensions 44 and 45, which are arranged on basal ends of the arms 21 and 25. Further, the contact portions 43a and 43b are formed by side walls or recesses of the main bodies 20 and 24.

Figure 8:
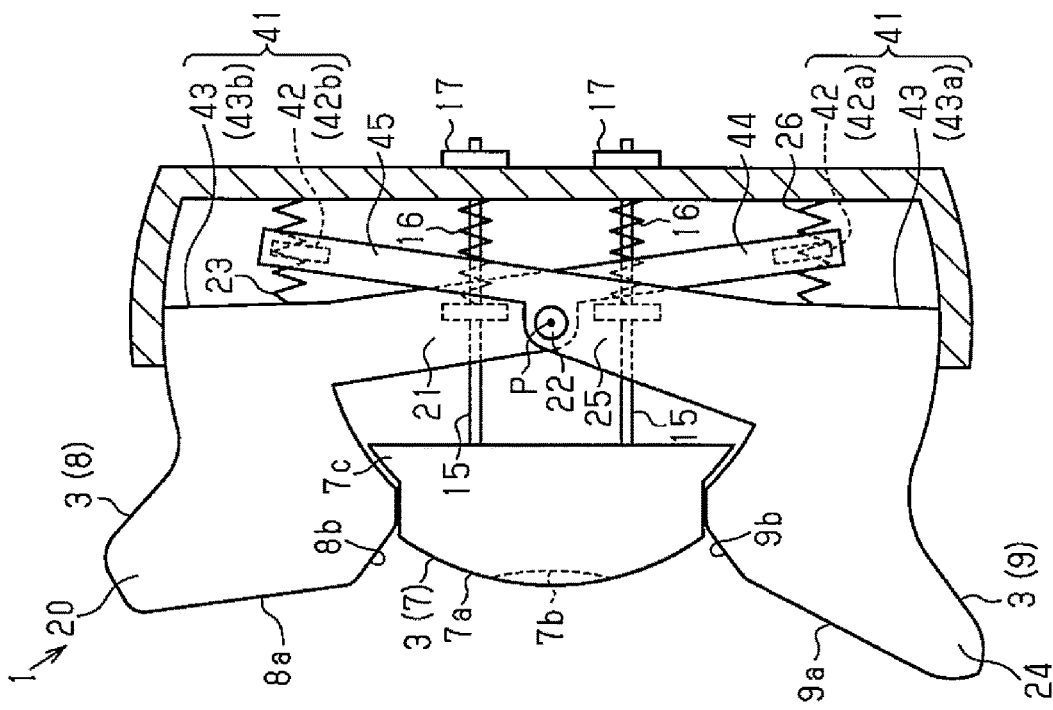
FIG. 8 is an operation diagram showing the second operation portions when operated.

As shown in FIG. 8, when the second operation portion 8 is lifted, the projection 42a on a basal end of the second operation portion 8 contacts the contact portion 43a of the second operation portion 9 and hinders a lowering operation of the second operation portion 9. When the second operation portion 9 is lowered, the same movement hinders a lowering operation of the second operation portion 8. Thus, when one of the second operation portions 8 and 9 is operated, erroneous operations of the other one of the second operation portions 8 and 9 can be reduced.

The structure of the second embodiment has the advantage described below in addition to advantages (1) to (7) of the first embodiment.

(8) The shifting device 1 includes the operation restriction units 41. When one of the second operation portions 8 and 9 is operated, the projections 42 on the second operation portions 8 and 9 contact the other one of the second operation portions 8 and 9 (more specifically, contact portions 43). This hinders operation of the other one of the second operation portions 8 and 9. Thus, when one of the second operation portions 8 and 9 is operated, the other one of the second operation portions 8 and 9 cannot be operated. This is further advantageous for preventing erroneous operations of the second operation portions 6 and 9.

The above embodiments may be modified as described below.

Figure 9:
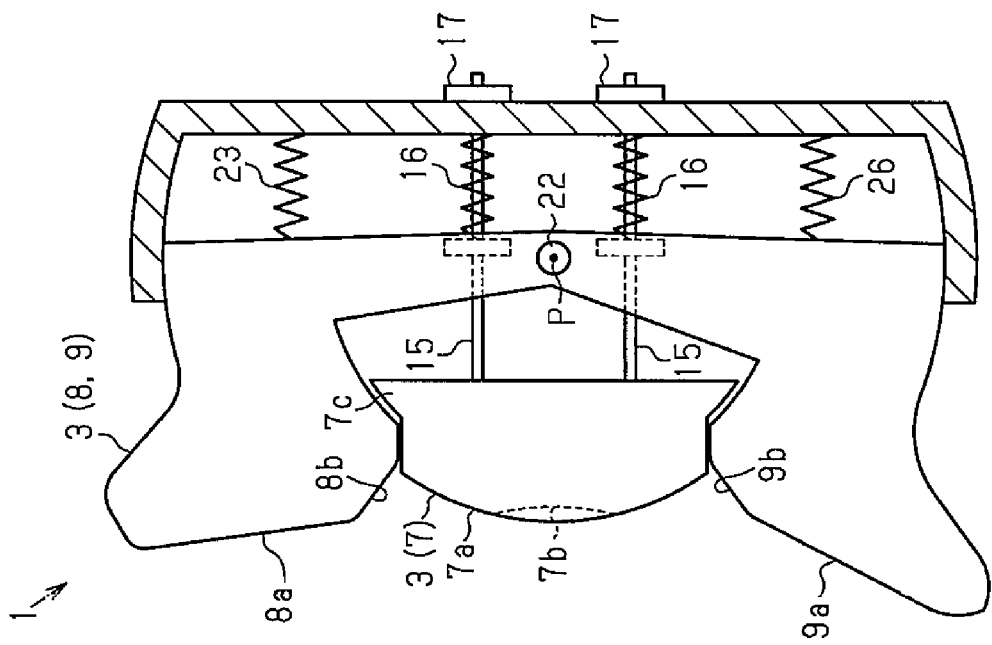
FIG. 9 is a diagram showing another example of a shifting device.

In each of the above embodiments, as shown in FIG. 9, the second operation portions 8 and 9 are not limited to members that pivot about the shaft and may be, for example, members that move along arcuate guides 51 in an arcuate path. In this case, the second operation portions 8 and 9 also pivot about the pivot center P.

Figure 10:
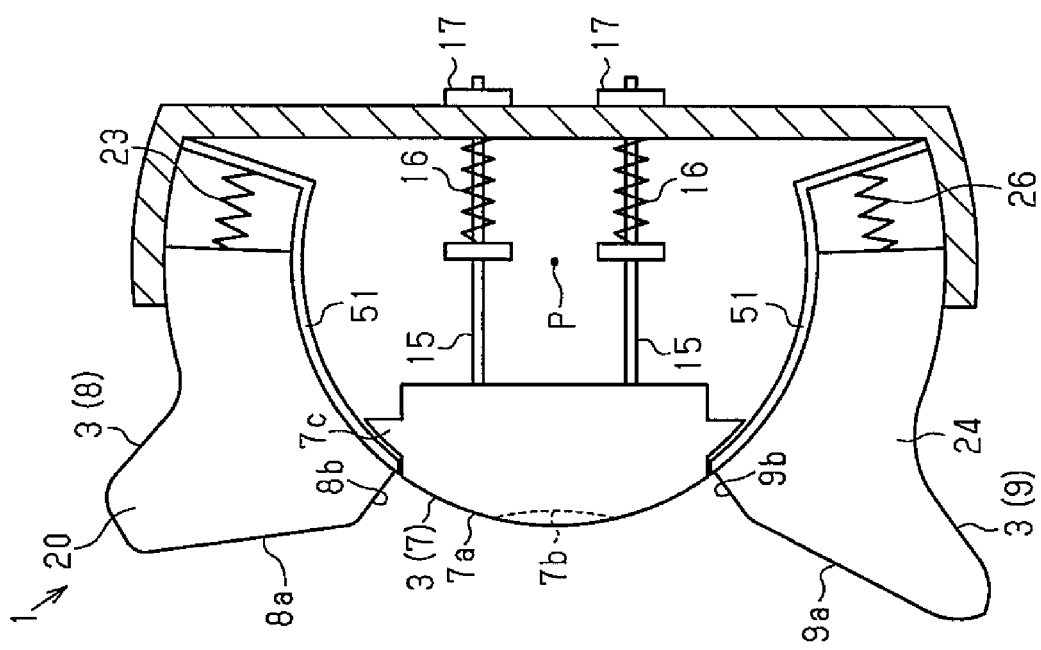
FIG. 10 is a diagram showing a further example of a shifting device.

In each of the above embodiments, as shown in FIG. 10, the second operation portions 8 and 9 may be an integral member. This allows for reduction in the number of components.

In the second embodiment, the operation restriction unit 41 does not have to be formed by a combination of a projection and a wall. The operation restriction unit 41 may have any shape that hinders operation of the second operation portions 8 and 9.

In the second embodiment, the operation restriction units 41 may function to determine the operation amounts (operation strokes) of the second operation portions 8 and 9.

In each of the above embodiments, the number of the second operation portions 8 and 9 may be three or more.

In each of the above embodiments, the second operation portions 8 and 9 do not have to be lined in the vertical direction. Instead, for example, the second operation portions 8 and 9 may be lined in the lateral direction.

In each of the above embodiments, the shapes of the first operation portion 7 and the second operation portions 8 and 9 may be changed to shapes other than those illustrated in the embodiments.

In each of the above embodiments, the first operation portion 7 and the second operation portions 8 and 9 do not have to be of a momentary type and may be changed to an alternate type.

In each of the above embodiments, the restriction wall 12 may be arranged at opposite sides of the shifting device 1 in the widthwise direction.

In each of the above embodiments, the shift ranges allocated to the first operation portion 7 and the second operation portions 8 and 9 may be changed.

In each of the above embodiments, the vehicle may be a left-hand drive vehicle. In this case, the shifting device 1 of the present example has a symmetrical shape in which the left and right are reversed.

In each of the above embodiments, the shifting device 1 is not limited to a shift-by-wire type and may be of another type.

The invention claimed is:

1. A shifting device comprising:
an operation unit operated to switch a plurality of shift ranges of a transmission installed in a vehicle, wherein the operation unit includes
a first operation portion that undergoes a push operation in a predetermined direction, and
a plurality of second operation portions located at opposite sides of the first operation portion, wherein the second operation portions are operated in different directions about a common pivot center, and each of the second operation portions includes a second operation surface,
wherein an angle at which the second operating surface of one of the second operating portions arranged at one side of the first operating portion is inclined with respect to the predetermined direction is different from an angle at which the second operating surface of the other one of the second operating portions arranged at the other side of the first operating portion is inclined with respect to the predetermined direction, and
wherein the shifting device further comprises an operation restriction unit that includes a projection, wherein when one of the plurality of second operation portions is operated, the projection contacts the other one of the second operation portions to restrict operation of the other one of the second operation portions.

2. The shifting device according to claim 1, further comprising
a restriction wall located at one side in a widthwise direction of the first operation portion and the second operation portions.

3. The shifting device according to claim 1, wherein each of the plurality of second operation portions includes
a main body including the second operation surface, and
an arm extending from a side of the main body opposite to the second operation surface toward the common pivot center.

4. The shifting device according to claim 2, wherein
the first operation portion includes a first operation surface,
the first operation surface of the first operation portion is curved about the common pivot center, and
the restriction wall includes a tapered surface formed on an end face of the restriction wall at a side of the operation unit, wherein the tapered surface guides operation of the operation unit.

5. The shifting device according to claim 3, further comprising a housing that includes a pivot shaft arranged on the common pivot center, wherein
the second operation portions are arranged in symmetry sandwiching the first operation portion, and
the arms of the second operation portions are supported by the pivot shaft of the housing.

6. The shifting device according to claim 1, wherein
the first operation portion includes a first operation surface,
the second operation surfaces of the plurality of second operation portions are inclined at different angles and directed so as to approach each other as the first operation surface becomes closer, and
the first operation portion includes a recess formed in the first operation surface, wherein the recess guides operation of the first operation surface.

7. The shifting device according to claim 1, wherein
the first operation portion is used for N-range operation and operated to switch the transmission to an N-range, one of the plurality of second operation portions is used for R-range operation and operated to switch the transmission to an R-range, and the other one of the plurality of second operation portions is used for D-range operation and operated to switch the transmission to a D-range.

8. A shifting device comprising:

an operation unit operated to switch a plurality of shift ranges of a transmission installed in a vehicle, wherein the operation unit includes
- a first operation portion that undergoes a push operation in a predetermined direction, and
- a plurality of second operation portions located at opposite sides of the first operation portion, wherein the second operation portions are operated in different directions about a common pivot center; and a restriction wall located at one side in a widthwise direction of the first operation portion and the second operation portions, wherein the restriction wall is formed along a direction in which the first operation portion and the second operation portions are arranged, and the restriction wall includes a tapered surface formed on an end face of the restriction wall at a side of the operation unit, wherein the tapered surface guides operation of the operation unit.

* * * * *